MULTI-GAP MAGNETIC HEAD

Filed Nov. 13, 1962 3 Sheets-Sheet 1

Inventor
Saburo Uemura by Hill, Sherman, Meroni, Gross & Simpson Attys.

March 7, 1967 SABURO UEMURA 3,308,449

MULTI-GAP MAGNETIC HEAD

Filed Nov. 13, 1962 3 Sheets-Sheet 2

Inventor
Saburo Uemura by Hill, Sherman, Meroni, Gross & Simpson Attys.

March 7, 1967 | SABURO UEMURA | 3,308,449

MULTI-GAP MAGNETIC HEAD

Filed Nov. 13, 1962 | 3 Sheets-Sheet 3

Inventor
Saburo Uemura by Hill, Sherman, Meroni, Gross & Simpson Attys.

United States Patent Office 3,308,449

Patented Mar. 7, 1967

3,308,449

MULTI-GAP MAGNETIC HEAD

Saburo Uemura, Tokyo, Japan, assignor to Sony Corporation, Tokyo, Japan, a corporation of Japan Filed Nov. 13, 1962, Ser. No. 237,202
Claims priority, application Japan, Nov. 15, 1961, 36/41,547
31 Claims. (Cl. 340—174.1)

This invention relates to a magnetic head and more particularly to a multi-gap magnetic head for reading a magnetic scale.

One object of this invention is to provide a multi-gap magnetic head which is particularly adapted for reading a magnetic scale and which is simple and compact in construction and accurate in operation.

Another object of this invention is to provide a multi-gap magnetic head which is able to reproduce only signals of a constant wave length from a magnetic scale.

A further object of this invention is to provide a multi-gap magnetic head having improved sensitivity for reading a constant amplitude signal recorded on a magnetic scale.

A still further object of this invention is to provide a multi-gap magnetic head providing a greatly improved signal to noise ratio, and which is especially adapted for reading a magnetic scale.

Other objects, features and advantages of this invention will become apparent from the following description taken in conjunction with the accompanying drawings in which.

Figure 1:
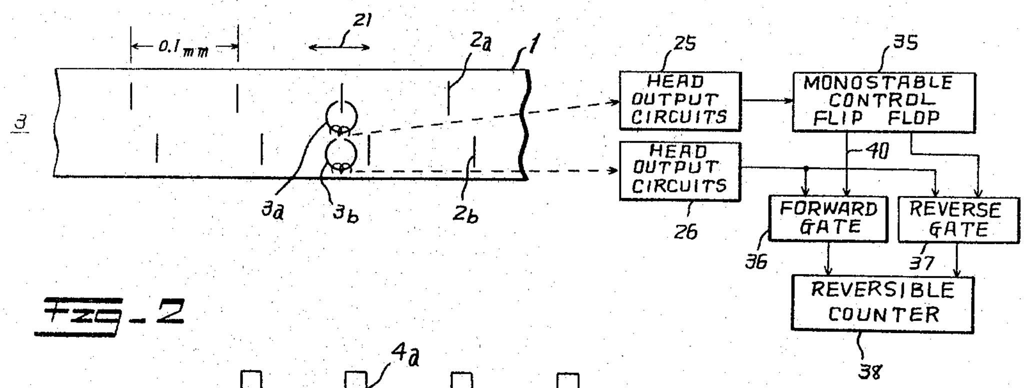
FIGURE 1 is a schematic diagram for explaining a multi-gap magnetic head according to this invention.
Figure 2:
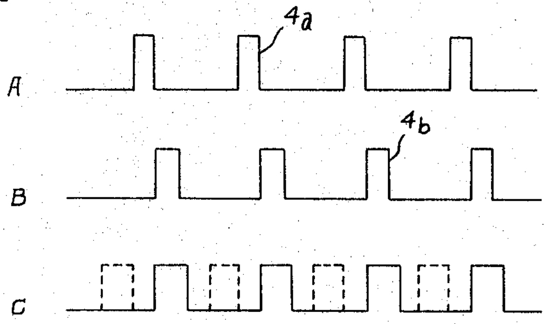
FIGURE 2 is an explanatory wave form diagram.

In the numerical control of machine tools, the electric measurement of "length" is now an important problem. It is a fundamental problem not only in the numerical control of machine tools but also in other cases. The art of magnetic recording has been employed in a system for the measurement of "length." In such a system, a reference scale called a magnetic scale is generally read by a magnetic head and the read length is converted to an electric signal. This magnetic scale is made by coating magnetic powder on a glass plate or a non-magnetic metallic band, and then magnetizing the coating for example with a rectangular or sine wave pattern of predetermined wavelength. An example of the measurement of length using such a magnetic scale will hereinafter be explained with reference to FIGURES 1 and 2. A magnetic scale 3 is shown in FIGURE 1 comprising a long narrow strip of plate glass having a layer 1 of magnetizable particles coated on one surface thereof. A pair of pulse groups 2*a* and 2*b* are recorded along the length of the magnetic medium 1. Each pulse group may comprise a series of discrete pulses separated by a distance of 0.1 millimeter, for example. Ordinary magnetic heads 3*a* and 3*b* are shown in scanning contact with the respective channels of the record medium containing pulse groups 2*a* and 2*b*. If now the mangetic heads 3*a* and 3*b* move to the right as viewed in FIGURE 1 with respect to the magnetic scale 3, pulses 4*a* generated by the magnetic head 3*a* lead pulses 4*b* produced by the magnetic head 3*b* as illustrated in FIGURES 2A and 2B. When the magnetic heads 3*a* and 3*b* move to the left as seen in FIGURE 1 the pulses 4*b* lead the pulses 4*a*. Consequently, the direction in which the magnetic scale moves is distinguished and the number of the pulses 4*b*, corresponding to the number of magnetic marks on the scale in group 2*b*, is counted by a reversible counter, thereby indicating the distance of the relative movement between the magnetic heads and the magnetic scale. That is, the magnetic scale is fixed and the magnetic heads move in a straight line in step with the movement of a workpiece being machined, for example, to provide a measure of the distance of movement of the workpiece relative to a fixed tool position.

Figure 3:
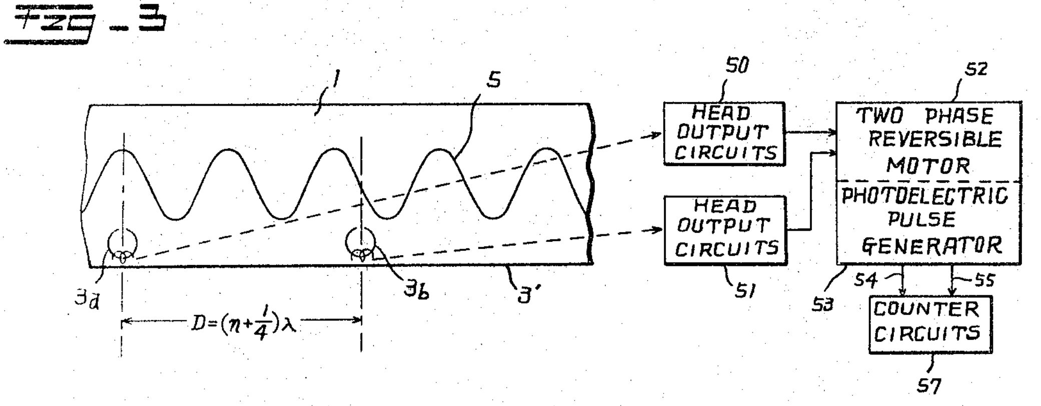
FIGURE 3 is another schematic diagram for explaining this invention.
Figures 5, 6, 7:
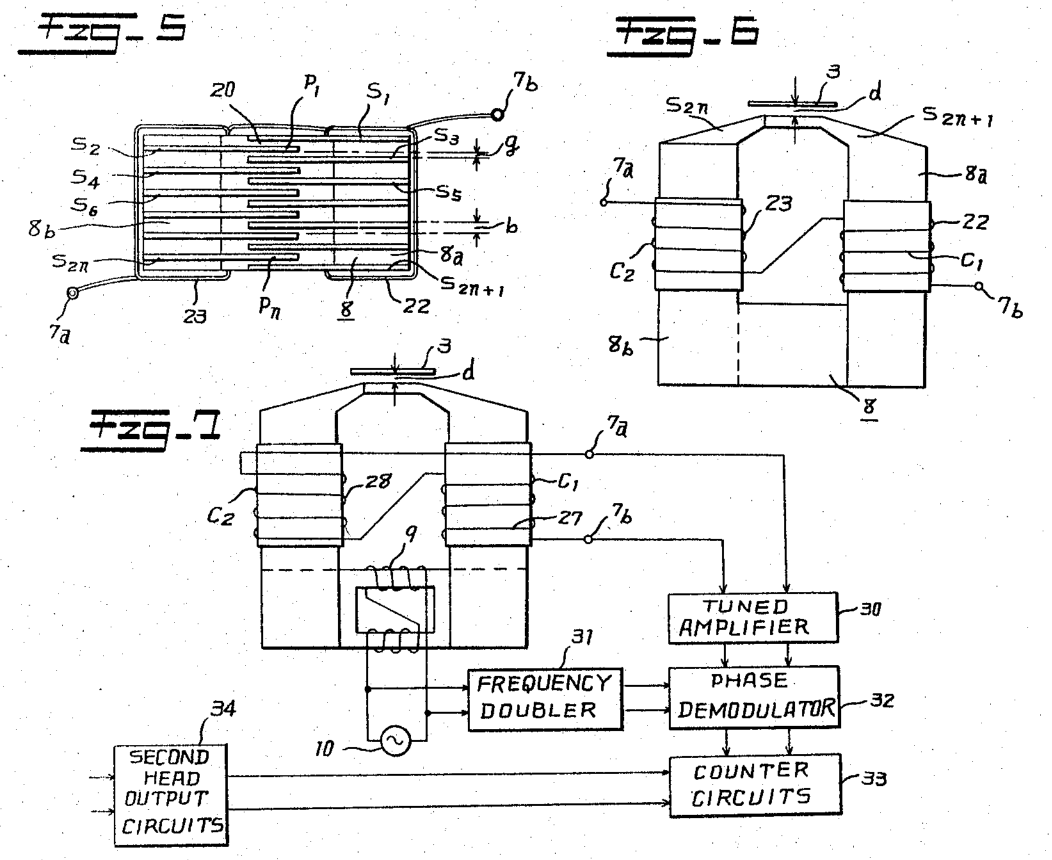
FIGURE 5 is a front view illustrating an example of a multi-gap magnetic head of this invention.
FIGURE 6 is a plan view of the head of FIGURE 5.
FIGURE 7 is a plan view showing another example.

Referring now to FIGURE 3, another example of measurement by means of the magnetic scale will be explained. A sine waveform signal 5 is diagrammatically indicated as being recorded on the magnetic medium 1. The two magnetic heads 3*a* and 3*b* may either be in actual contact with the surface of the record medium or spaced from the surface by a distance $d$ such as indicated in the embodiment of FIGURE 6. The distance between the two magnetic heads is selected to be $(N+1/4)\lambda$, where $\lambda$ is the wavelength of the sine waveform signal 5 and N is an integer. By moving both magnetic heads at a high speed along the length of an article to be measured, two sine waveform outputs having a phase difference of 90° from each other can be obtained from the two magnetic heads 3*a* and 3*b*. A corresponding rotating vector of a certain amplitude can be obtained by composing the two outputs vectorially. Accordingly, by reading the number of complete revolutions of the vector and measuring a rotation angle, the length can be precisely measured within one pitch of the magnetic scale. That is, the measurement of the length can be performed by the interpolating method.

In either method described above, the flux-sensitive heads are employed in consideration of the irregular speed of movement of the two magnetic heads 3*a* and 3*b*. In the case of the interpolating method, it is required that the magnetic scale be magnetized correctly with the sine wave signal and that the amplitude of the head ouput voltages be constant. The zero point of the head outputs must not drift. In comparing on the one hand the case where a rectangular waveform signal is recorded with a saturation amplitude on a magnetic medium, and on the other hand the case where a sine waveform signal is recorded, usually the head output signal amplitude for a sine wave recorded signal is less than ½ of that for a rectangular waveform recorded signal. Furthermore, it is difficult to keep constant the amplitude of the head output because of the variation of the distance between the magnetic medium and the magnetic head and because of irregularities in the magnetic medium. The usable magnetic flux from a magnetic scale is usually as small as 0.1 Maxwell or so, and hence it is also difficult to maintain the zero point stably under the influence of the earth's magnetic field and/or the magnetization of a body in the vicinity of the head.

The use of a magnetic scale is different from ordinary magnetic recording, and in reading a magnetic scale it is highly desirable to have a magnetic head which is able to reproduce only signals of constant wavelength.

In view of the foregoing, this invention is intended to provide a novel magnetic head having a plurality of gaps and highly improved sensitivity, by which a head output of a constant amplitude can be obtained. The magnetic head of this invention is thus highly advantageous in a magnetic scale system.

Figure 4:
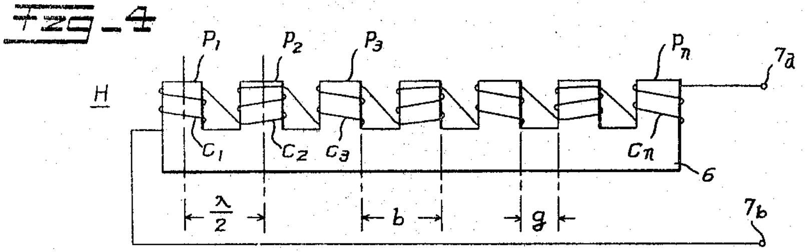
FIGURE 4 is a fundamental schematic diagram illustrating an embodiment of a multi-gap magnetic head according to this invention.

In this invention, a magnetic head H is provided with a plurality of magnetic poles $P_1, P_2, \ldots P_n$ arranged in the manner of a comb as shown in FIGURE 4. The reference numeral 6 designates a common magnetic core of these magnetic poles. The distance between the adjacent magnetic poles is selected as substantially equal to $\lambda/2$ when the wavelength of a sine wave or pulse waveform recorded on the magnetic scale is $\lambda$. Coils $C_1, C_2 \ldots C_n$ are wound on the successive magnetic poles in successively opposite senses and are connected in series between terminals *7a* and *7b*. The outputs of the successive coils will then be of aiding polarity to provide a maximum output voltage between the terminals *7a* and *7b*. This will be seen from a consideration of the fact that the magnetic scale has recorded thereon a sine waveform signal of a wavelength of $\lambda$ or a pulse signal having an interval of $\lambda$. The specific magnetic head described above with reference to FIGURE 4 is fundamental, but in the case where the pitch of the magnetic scale is as small as 0.1 millimeter as indicated in FIGURE 1, a plurality of the magnetic poles are practically difficult to arrange. In this case, magnetic heads such as illustrated in FIGURES 5 to 7 are practicable.

In FIGURES 5 and 6 a head is shown having laterally overlapping poles defining successive gaps therebetween. A pair of confronting core portions *8a* and *8b* of a common magnetic core 8 (corresponding to the magnetic core 6 in FIGURE 4) have magnetic plates $S_1, S_2, S_3, \ldots S_n$ extending therefrom with uniform spaces therebetween. The ends of the magnetic plates $S_1, S_3, S_5, \ldots S_{2n+1}$ projecting from the core portion *8a* and those of the magnetic plates $S_2, S_4, S_6 \ldots S_{2n}$ projecting from the other core portion *8b* are partially overlapped to provide magnetic poles $P_1, P_2, P_3, \ldots P_n$ at the overlapping portions. On the respective magnetic plates $S_1, S_2, S_3 \ldots S_n$ coils $C_1, C_2, C_3 \ldots C_n$ may be wound with successively opposite senses to produce induced voltages of aiding polarity between the output terminals as described in connection with FIGURE 4. If the coils are wound in the same direction on the plates, the connection of the coils may be successively reversed so that the same result is obtained as in the above described example.

In FIGURES 5 and 6, the distance between the adjacent magnetic poles $P_1, P_2, \ldots P_n$ is also selected as substantially equal to $\lambda/2$. This magnetic head is thus exactly the same as that described in connection with FIGURE 4 fundamentally.

FIGURE 7 illustrates a magnetic modulator type magnetic head, in which the center portion of the magnetic core 8 of the ring-shaped multi-gap magnetic head shown in FIGURES 5 and 6 is removed and coils 9 are wound on the remaining portions to which a constant amplitude alternating current source 10 is connected. The source 10 has a relatively high frequency in comparison with the maximum frequency to be produced by scanning of the magnetic scale.

The features of the multi-gap magnetic heads described above will become apparent from the following mathematical discussion.

If the distance between the adjacent gaps is $b$ and the wavelength $\lambda$ of the magnetic scale is $\lambda=2b$, the multiple gap magnetic head has a high sensitivity to a recorded wavelength of $\lambda$, but its sensitivity becomes very low for other recorded wavelengths. The increase of the sensitivity is very advantageous in the stability of the zero point, for example, $\lambda$. The selectivity of the head with respect to a wavelength $\lambda$ has the advantage that even when the magnetic scale is not recorded as a perfect sine wave, the output of the magnetic head is reproduced as a sine wave and a measurement by the interpolating method can accurately be carried out.

When a magnetic medium is magnetized in accordance with a sine wave function and the longitudinal direction of the medium is termed the X-axis and the wavelength is $\lambda$, the residual magnetic flux $\Phi r$ retained by the medium as a function of distance $x$ along the medium is given by $$\Phi r=k_1 I \sin 2\pi x/\lambda \qquad (1)$$

where $k_1$I is a constant. The output voltage from an ordinary ring-shaped magnetic head is given by the following formula wherein the relative speed between the magnetic medium and the magnetic head is $v$:

$$e_2=k_2 I v\frac{2\pi}{\lambda}\cos\frac{2\pi x}{\lambda} \qquad (2)$$

where $k_2$I is a constant. By substituting $x=vt$ and $f=v/\lambda$ $$e_2=k_2 I 2\pi f \cos 2\pi f t \qquad (3)$$

is obtained.

In a flux-sensitive head such as a variable reluctance head, the output voltage is given irrespective of the relative speed $v$ as follows:

$$e_3=k_3 I \sin\frac{2\pi x}{\lambda} \qquad (4)$$

where $k_3$I is a constant. When the gap length $g$ is not negligible as compared with the wavelength $\lambda$, the gap loss expressed hereinbelow must be taken into consideration.

$$\text{gap loss}=\frac{\sin(\pi g/\lambda)}{\pi g/\lambda} \qquad (5)$$

When the magnetic medium and the surface of the magnetic head are spaced from each other by a distance $d$, the following formula must be added:

$$\text{spacing loss}=55d/\lambda \text{ decibels} \qquad (6)$$

The Formula 6 is obtained from $$\text{spacing loss}=e^{-2\pi d/\lambda} \qquad (7)$$

In the magnetic head shown in FIGURES 5 and 6, $g\approx\lambda/4$ and the distance $d$ between the magnetic scale and the gap cannot be neglected; accordingly an output of each gap is given by $$k\frac{\sin(\pi g/\lambda)}{\pi g/\lambda}e^{-2\pi d/\lambda}\sin\frac{2\pi x}{\lambda} \qquad (8)$$

(Gap loss) (spacing loss) (residual flux variation) where $k=Ik_3$. This is a formula regarding the flux-sensitive head.

A resultant output of a magnetic head in which a plurality of pole members are arranged at intervals $b$ (with the first gap located at position $x$ on the scale) and coils are wound thereon in opposite sense one after another as shown in FIGURE 4 is obtained by $$k\frac{\sin(\pi g/\lambda)}{\pi g/\lambda}e^{-2\pi d/\lambda}\Big[\ldots+\sin\frac{2\pi}{\lambda}(x-2b)-\sin\frac{2\pi}{\lambda}(x-b)$$
$$+\sin\frac{2\pi x}{\lambda}-\sin\frac{2\pi}{\lambda}(x+b)+\sin\frac{2\pi}{\lambda}(x+2b)-\ldots$$
$$+(-1)^k\sin\frac{2\pi}{\lambda}(+kb)+\ldots\Big]$$

Considering only the terms in the bracket [ ] in Equation 9, and substituting in accordance with the identity sin $(A\pm B)=\sin A\cos B\pm\cos A\sin B$, the following is given:

$$[\ ]=\sin\frac{2\pi x}{\lambda}\Big(\ldots+\cos\frac{2\pi}{\lambda}\cdot 2b-\cos\frac{2\pi}{\lambda}\cdot b$$
$$+\cos 0-\cos\frac{2\pi}{\lambda}\cdot b+\ldots\Big)+\cos\frac{2\pi}{\lambda}\Big(\ldots$$
$$-\sin\frac{2\pi}{\lambda}\cdot 2d+\sin\frac{2\pi}{\lambda}\cdot b+\sin 0-\sin\frac{2\pi}{\lambda}\cdot b$$
$$+\sin\frac{2\pi}{\lambda}\cdot 2b-\ldots\Big) \qquad (10)$$

The second term of the Equation 10 is eliminated for $b \approx \lambda/2$ and the following equation is then obtained:

$$[\quad] = \sin\frac{2\pi x}{\lambda}\left\{1+2\sum_{k=1}^{n}(-1)^k \cos\frac{k2\pi b}{\lambda}\right\} \qquad (11)$$

where $\sin 2\pi x/\lambda$ is the response when one gap is used and the terms in the bracket [ ] are the effect or characteristic when $n$ additional gaps are employed. In the case where the terms in the bracket at the right hand side of Equation 11 are represented by the letter A and the distance between the gaps, $b$, is $\lambda/2$, $$A=\left\{1+2\sum_{k=1}^{n}(-1)^k \cos\left(k\cdot\frac{2\pi b}{\lambda}\right)\right\}=1+2n\left(b=\frac{\lambda}{2}\right) \qquad (12)$$

and the output is increased in proportion to the number of gaps of the head.

If magnetic scale is recorded in accordance with a sine wave of wavelength $\lambda$, its higher harmonic waves must be taken into consideration. However, they are not a function of time $t$ but a function of $x$ in the sense of displacement.

The higher harmonic wave which is twice the frequency of the fundamental has a wavelength $\lambda 2$ equal to $\lambda/2$ and that three times the fundamental has a wavelength $\lambda 3$ equal to to $\lambda/3$.

When $b=\lambda/2$ and $\lambda_2=\lambda/2$ $$A=\left\{1+2\sum_{k=1}^{n}(-1)^k \cos\frac{2\pi b}{\lambda_2}\right\}_{b=\lambda_2}=\left\{1+2\sum_{k=1}^{n}(-1)^k\right\}$$

where A is 1 when $n$ is an even number and zero when $n$ is odd number.

This relationship is the same in higher harmonic waves of an even number $\lambda_4=\lambda/4 \ldots \lambda_{2m}=\lambda/2m$.

In higher harmonic waves of an odd number $\lambda_3=\lambda/3$, $\lambda_5=\lambda/5 \ldots$ $$A=1+2n \qquad (13)$$

Since the gap loss and the spacing loss shown in Formula 8 are greater for smaller wavelengths, the sensitivity of the head for higher harmonic waves is reduced and the distortion of the fundamental waveform in reproducing is also reduced. When $g=\lambda/4$, $b=\lambda/2$ and the distance between the heads and the magnetic medium is $d=0.1\lambda$, outputs for the high harmonic waves are given in the following table:

| | Fundamental wave, λ | High harmonic wave | | | |
|---|---|---|---|---|---|
| | | λ/2 | λ/3 | λ/4 | λ/5 |
| Spacing loss factor | 0.53 | 0.282 | 0.15 | 0.0795 | 0.042 |
| Gap loss factor | 0.902 | 0.56 | 0.286 | 0 | 0.17 |
| Resultant loss factor | 0.48 | 0.158 | 0.043 | 0 | 0.0071 |

If the number of the gaps, $1+2n$, is 11, its characteristics are as shown in the following table when the fundamental wave output level is taken as 1.

| | Fundamental wave, λ | High harmonic wave | | | |
|---|---|---|---|---|---|
| | | λ/2 | λ/3 | λ/4 | λ/5 |
| Spacing loss factor × Gap loss factor | 0.48 | 0.158 | 0.043 | 0 | 0.0071 |
| A factor of multigap magnetic head (n=5) | 11 | 1 | 11 | 1 | 11 |
| Overall characteristic | 5.3 | 0.158 | 0.47 | 0 | 0.078 |
| High harmonic wave / Fundamental wave | 1 | 0.03 | 0.039 | 0 | 0.0148 |

It is apparent from this table that even if the magnetic scale has a waveform distortion, the multi-gap magnetic head is able to reproduce it as a sine wave without any appreciable distortion.

From the Formula 12, the characteristic A of the head can be obtained when the distance of the gaps is constant and $\lambda$ is changed.

Figure 8:
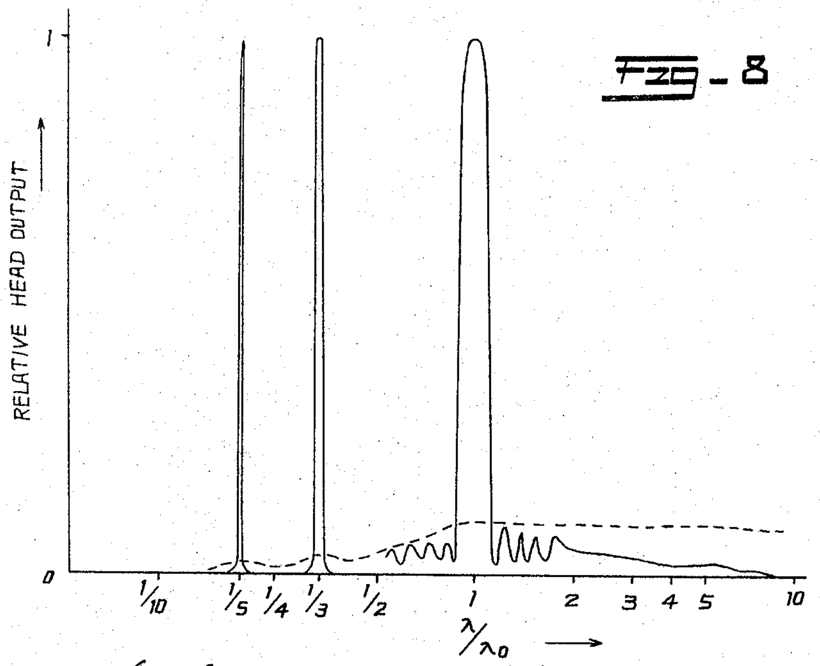
FIGURE 8 is a schematic diagram showing the sensitivity of a multi-gap magnetic head in accordance with this invention.

When $2b=\lambda$ and $\lambda$ is $2\lambda_0, 3\lambda_0 \ldots 10\lambda_0$, the value of A becomes 1. When $\lambda$ varies from $\lambda_0$ up and down, the waveform becomes substantially as shown in FIGURE 8. At the point of $\lambda=\lambda_0$, $\lambda=\lambda_{0/3}$, $\lambda=\lambda_{0/5}$, the width of a sharp tuning waveform is in inverse proportion to the number of gaps N. The width of the waveform at one half of maximum amplitude for $\lambda=\lambda_0$ approaches $2/N$ so that the selectivity is improved as a function of the gap number N. Thus, the sensitivity of the multi-gap magnetic head of this invention is very excellent and the signal to noise ratio is greatly improved.

Figure 9:
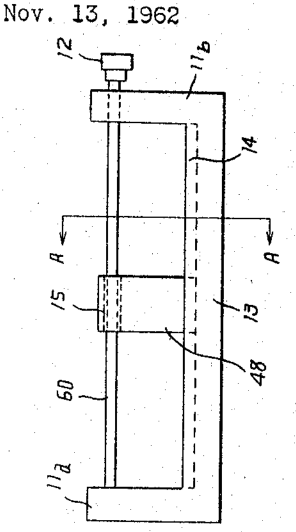
FIGURE 9 is a side view of a reading device using a magnetic head according to the present invention.
Figure 10:
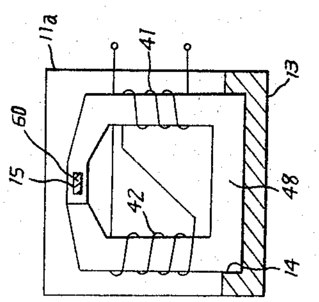
FIGURE 10 is a sectional view taken along the line A—A in FIGURE 9.
Figure 11:
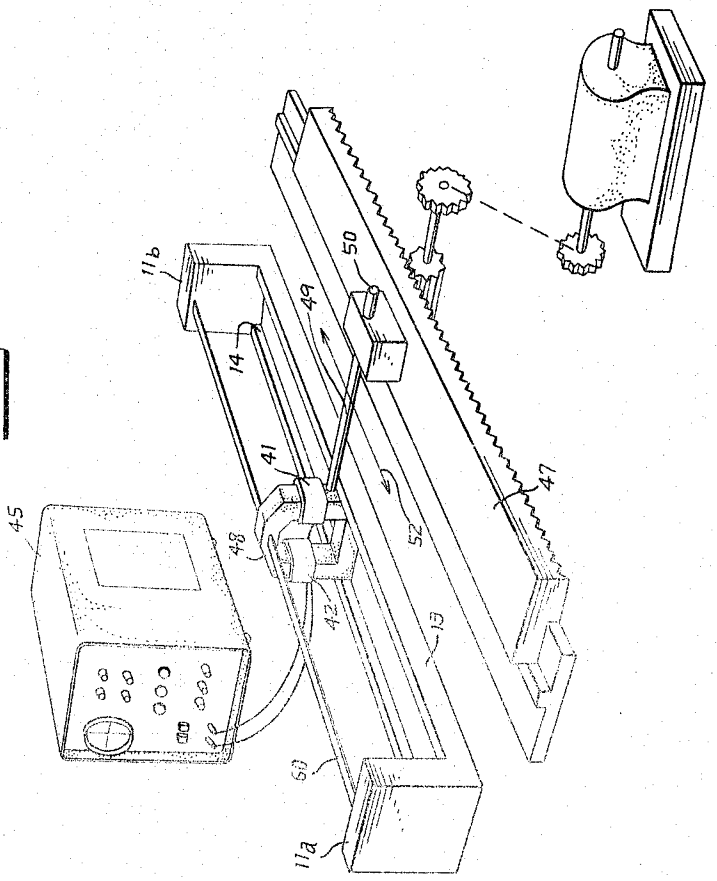
FIGURE 11 is a diagrammatic perspective view of a magnetic scale system utilizing a multiple gap magnetic head as illustrated in FIGURE 10.

The reading device using the magnetic head of this invention is as shown in FIGURES 9, 10 and 11. That is, between fixed side walls 11*a* and 11*b* of a supporter is stretched a magnetic scale 60 using, for example, a glass plate on which magnetic powder is attached; 12 is a controlling screw therefor. The magnetic head 48 of this invention is guided by a guide groove 14 formed on the base of supporter 13. When using the magnetic scale, an error can be reduced very much by sufficiently stretching the scale to be in a straight line. In this case, the influence of temperature on the scale can be avoided since the scale is formed integrally with the supporter 13. In the magnetic pole portions of the magnetic head of this invention, a hole or a guide 15 is provided, through which the magnetic scale is placed. The gap portion and the scale portion are always spaced from each other at a constant distance.

*Exemplary electric circuits for the embodiments of FIGURES 5, 6, 7 and 10*

FIGURE 1 illustrates a suitable electric circuit which may be utilized with multi-gap heads such as illustrated in FIGURES 5 and 6, 7 or 10. Each of these heads may have a series of twelve equal gaps such as indicated at 20 in FIGURE 5. The gaps may have a length in the direction of tape movement of 0.025 millimeter where the recorded wavelength is 0.1 millimeter as indicated in FIGURE 1. The heads thus have a length of about six times the wavelength or 0.6 millimeters in the direction of the double headed arrow 21 in FIGURE 1. In the system of FIGURE 1, two multiple gap heads move in unison along the length of the scale 3 and are in transverse alignment as diagrammatically indicated in FIGURE 1. In FIGURES 5 and 6, output windings 22 and 23 are indicated as linking legs 8*a* and 8*b* respectively to provide an arrangement equivalent to that described in connection with FIGURE 4. Thus for the embodiment of FIGURES 5 and 6, windings 22 and 23 of the head assembly corresponding to 3*a* in FIGURE 1 would be connected to head output circuits component 25, while similar windings of a second head of the type illustrated in FIGURES 5 and 6 would be connected to the head output circuits component 26 in FIGURE 1.

In the embodiment of FIGURE 7, head output windings as indicated at 27 and 28 would be connected to head output circuits comprising such elements as a tuned amplifier component 30 tuned to twice the frequency of the source 10, a frequency doubler component 31 and a phase demodulator component 32. The output of the phase demodulator component 32 is shown as being delivered to suitable counter circuits 33 which also receive the output from the output circuits component 34 of a second head identical to the head specifically shown in FIGURE 7. Referring to FIGURE 1, it will be understood that when heads 3*a* and 3*b* are of the type illustrated in FIGURES 5 and 7, the head output circuits 25 and 26 would include components such as 30, 31 and 32 in FIGURE 7 delivering output waveforms such as illustrated in FIGURES 2A and 2B but of greatly increased amplitude as compared to the case where a single gap head is utilized.

The counter circuits component 33 in FIGURE 7 may include a monostable control flip-flop component 35, gates 36 and 37 and a reversible counter 38 as indicated in FIGURE 1. The set output waveform via line 40 to gate 36 in FIGURE 1 may be as indicated in FIGURE 2C so that gate 36 transmits the pulses **4*b* when the heads move to the right as seen in FIGURE 1 while gate 37 is closed, and so that gate 37 transmits the pulses 4*b* to the counter 38 while gate 36 is closed during movement of the heads to the left as seen in FIGURE 1. Pulses delivered by gate 36 to the reversible counter 38 may cause the counter to count in one direction while pulses delivered by gate 37** may cause the counter to count in the opposite direction.

The head of FIGURE 10 may take the form either of the head of FIGURES 5 and 6 or of the head of FIGURES 5 and 7. Thus two heads such as indicated in FIGURE 10 may have windings such as indicated at 41 and 42 connected to the respective head output circuits 25 and 26 as illustrated in FIGURE 1. The counter component indicated at 45 in FIGURE 11 may include a head output circuits component such as indicated at 25 and the counter circuits such as indicated at 35, 36, 37 and 38 in FIGURE 1, for example. Any suitable means may be provided for causing the counter to count in opposite directions, for example a second head may be associated with a second magnetic scale identical to that shown in FIGURE 11 and may have head output circuits as indicated at 26 associated with the counter 45. Thus in FIGURE 11, the machine table 47 is illustrated as being coupled to a head 48 by means of a mechanical coupling 49 and a second mechanical coupling is partially indicated at 50 for coupling to a second head identical to the head 48 and operating on an identical second magnetic scale apparatus. The double headed arrow 52 in FIGURE 11 corresponds in direction to the double headed arrow 21 in FIGURE 1.

In the circuit arrangement for FIGURE 3, it is contemplated that two identical heads such as heads of the type shown in FIGURES 5 and 6, 7 or 10 will cooperate with the same magnetic scale 3'. The head output circuits components 50 and 51 would be the same as described in connection with FIGURE 1 and would deliver two-phase power to a two-phase motor component 52, for example, which might drive a photoelectric pulse generator component 53. The photoelectric pulse generator component 53 might deliver a series of output pulses such as indicated in FIGURE 2A via line 54 and a series of output pulses such as indicated in FIGURE 2B via line 55 in one direction of rotation of motor 52, while providing a phase shift of the pulses via line 54 relative to the pulses at line 55 comparable to that produced by a change in the direction of movement of the heads **3*a* and 3*b* in FIGURE 1. The counter circuits component 57 would then operate in the same way as components 35, 36, 37 and 38** in FIGURE 1.

In utilizing any of the multi-gap heads shown herein, the recorded waveform on the scales 3 or 3' could be recorded by the same identical multi-gap head for effective coupling of the recorded signal with the head during playback.

*Summary of operation*

Since the operation is substantially similar whether the head of FIGURE 4, FIGURES 5 and 6, FIGURE 7 or FIGURE 10 is utilized, the following comments will be applicable to any of the embodiments.

In the embodiment of FIGURE 1, magnetic scale 3 is provided with two series of magnetic marks **2*a* and 2*b*. Referring to the embodiment of FIGURE 11, one magnetic scale 60 may have the marks 2*a* thereon while a second identical scale (not shown) may have the marks 2*b* thereon. The two multi-gap heads such as the one indicated at 48 in FIGURE 11 are coupled to the moving table 47 by means of mechanical coupling means 49 and 50 so that the two multi-gap heads are in transverse alignment as indicated diagrammatically for the heads 3*a* and 3*b* in FIGURE 1. As the heads move to the right as seen in FIGURE 1, pulses 4*a* from output circuits component 25 lead pulses 4*b* from output circuits component 26 by an amount such that gate 36 transmits the pulses 4*b* and the counter 38 counts in the forward direction, for example. When the heads move to the left as seen in FIGURE 1, the pulses 4*a* will lag the pulses 4*b* and gate 36 will be closed while gate 37 is open so that the counter 38** counts in the reverse direction.

In the embodiment of FIGURE 3, the output circuits component 50 delivers a sine wave output which is 90° leading with respect to the sine wave output from circuits component 51 in one direction of movement of the heads and is lagging by 90° in the other direction of movement of the heads. The rotating field produced by these two output since waves may be utilized to drive a suitable reversible counter circuits component 57, for example through the medium of a two-phase motor and a photoelectric pulse generator component as indicated in FIGURE 3.

It is found that with the spacing between the successive poles in the heads of FIGURES 4, 5 and 6, 7 and 10 equal to an odd multiple of $\lambda/2$ where $\lambda$ is the recorded wavelength on the scale greatly increased sensitivity is obtained as indicated in FIGURE 8.

It will be apparent that many modifications and variations may be effected without departing from the scope of the novel concepts of this invention.

What is claimed is:

1. A transducer system comprising (a) a record medium having a signal track extending in a longitudinal direction therealong and having a periodically recurring signal recorded along said track of recorded wavelength $\lambda$, (b) transducer head means coupled to said signal track for scanning of said recorded signal and comprising a series of poles successively spaced along said signal track and defining a series of gaps for coupling of the head means to a series of longitudinally spaced regions of said signal track simultaneously, said gaps having a spacing therebetween equal to $m\lambda/2$ where $m$ is an integer, (c) means coupled to said transducer head means and simultaneously responsive to the signal fluxes from the record medium at each of said gaps for producing an electric output in accordance with the signal fluxes from the regions of said signal track instantaneously coupled to said head means.

2. The system of claim 1 with said regions of the signal track coupled to said series of gaps all producing additive outputs in said coupling means so that said electrical output from said coupling means is increased over the output produced by one gap in proportion to the number of gaps.

3. The system of claim 2 with the coupling means comprising winding means coupled to all of the poles with flux from the regions of the record medium at a given instant being directed into one set of alternate poles and returning via a second set of intervening poles which intervening poles alternate between the alternate poles of said one set, and the poles being spaced $m\lambda/2$ where $m$ is an odd integer, the poles being in a line along one side of the record medium.

4. The system of claim 3 with the winding means comprising a first winding coupled to the one set of alternate poles and a second winding coupled to the second set of intervening poles, and the first and second windings being connected to produce additive outputs in response to signal flux from the record medium.

5. The system of claim 2 with the record medium comprising a member of rigid material having fixed supports mounting said member in a straight rigid condition throughout the length of the record medium.

6. The system of claim 5 with the member being mounted by said supports under tension to reduce the effects of temperature on said record medium.

7. The system of claim 2 with said transducer head means comprising a series of poles successively spaced along said signal track and defining a series of at least three gaps between the successive poles for simultaneous coupling of the head means with at least three longitudinally spaced regions of the signal track simultaneously.

8. The system of claim 7 with the sucessive poles of said series being spaced by a distance equal to substantially $m\lambda/2$ where $m$ is an odd integer.

9. The system of claim 8 with said transducer head means having a series of substantially equally spaced poles of substantially equal dimension in the direction of the signal track and said poles defining gaps of substantially equal size and the number of gaps being approximately twelve.

10. The system of claim 9 with said poles defining gaps having a dimension of approximately $\lambda/4$, and the gaps having a spacing substantially equal to $\lambda/2$.

11. The system of claim 10 with the poles being spaced from the record medium by a distance of approximately $0.1\lambda$.

12. The system of claim 11 with the record medium comprising a rigid material having a periodically recurring signal recorded along said track of recorded wavelength $\lambda$ equal to approximately 0.1 millimeter.

13. A magnetic transducer system comprising (a) a magnetic record member having a signal track extending in a longitudinal direction therealong and having a periodically recurring signal recorded along said track of recorded wavelength $\lambda$, (b) magnetic transducer head means coupled to said signal track for scanning of the recorded signal and comprising a magnetic core having spaced magnetic core portions disposed at respective opposite sides of said signal track with magnetic plates extending from each core portion toward the other core portion transversely to the longitudinal direction of said signal track and interdigitated to provide a series of poles having gaps therebetween for simultaneous coupling of the head means to a series of longitudinally spaced regions of said signal track, said gaps having a spacing therebetween equal to $m\lambda/2$ where $m$ is an odd integer, and (c) winding means coupled to said core portions and simultaneously responsive to the signal fluxes from the record medium at each of said gaps for producing an electric output in accordance with the signal fluxes from the regions of the signal track instantaneously coupled to said magnetic transducer head means.

14. The magnetic transducer system of claim 13 with means coupled to said core for applying a relatively high frequency magnetomotive force to said magnetic core for operating said transducer head means as a magnetic modulator head.

15. The system of claim 13 with the regions of the signal track simultaneously coupled to said gaps of said series of poles all producing additive outputs in said winding means so that said electric output from said winding means is increased over the output produced by one gap in accordance with the number of gaps of said transducer head means.

16. The magnetic transducer system of claim 13 with said magnetic plates having a hole therethrough in the vicinity of said series of magnetic gaps through which said record medium extends.

17. The system of claim 16 with said record medium comprising a straight elongated member of rigid material extending through said hole in said magnetic plates and having at least three regions of said signal track thereof simultaneously coupled to said transducer head means for producing additive outputs in said winding means and said electric output of said winding means being increased over the output produced by one gap in proportion to the number of gaps of said transducer head means.

18. A magnetic transducer system comprising a common magnetic core having a plurality of magnetic poles defining a plurality of magnetic gaps which are substantially equally spaced from each other, and a plurality of coils coupled to the respective magnetic poles with the coils being connected in a series electric circuit and in aiding relation so that the outputs of the coils are in phase and additive with respect to said series electric circuit when fluxes of predetermined phase are applied to said gaps, and a magnetic record medium for supplying said fluxes of said predetermined phase to said gaps, the record medium being simultaneously in coupling relation to each of said magnetic poles.

19. The system of claim 18 with each coil being wound on one of said poles, the coils on successive poles being wound in opposite directions and being connected in series so that the voltages induced in the successive coils are additive with respect to the series electric circuit, the magnetic record medium having a length substantially exceeding the span of said magnetic poles and having a constant frequency signal of constant recorded wavelength $\lambda$ recorded thereon, the poles defining at least three gaps and being spaced apart substantially a distance of $m\lambda/2$ where $m$ is an odd integer.

20. The system of claim 18 wherein said record medium comprises a magnetic scale having a signal of wavelength $\lambda$ recorded thereon and the distance between adjacent poles is substantially equal to one half $\lambda$.

21. The system of claim 20 with said scale comprising rigid material having a length greatly exceeding that of the head, and the recorded wavelength $\lambda$ being of the order of 0.1 millimeter, said groups of magnetic plates defining a number of gaps of the order of 12 all coupled simultaneously to said magnetic scale.

22. A multi-gap magnetic head having a pair of confronting core portions, said core portions having respective groups of magnetic plates extending therefrom into interdigitated overlapping relation to define a plurality of magnetic poles having a plurality of gaps of substantially equal spacing from each other, and coils wound on the respective magnetic plates and connected in series circuit in additive relation so that the outputs of the respective coils are additive in said series circuit when the gaps are coupled to a record medium supplying signal fluxes of predetermined phase thereto.

23. A magnetic head according to claim 22 with means for supplying a relatively high frequency alternating magnetomotive force to said magnetic core for operating said head as a magnetic modulator.

24. A magnetic head according to claim 22 with said magnetic plates having a guide hole formed therein in the vicinity of said gaps, and said record medium comprising a magnetic scale extending through said hole.

25. The head of claim 22 with said magnetic poles providing a number of gaps of the order of 12, the poles having a spacing of the order of 0.05 millimeter, the coils on the respective groups of magnetic plates being wound in opposite directions and connected in series so that fluxes introduced at each of the gaps of the order of 12 in number will produce voltages in the coils which are additive with respect to said series circuit.

26. The head of claim 22 with a magnetic scale extending transversely to the successive magnetic plates and simultaneously in coupling relation to each of said magnetic poles and having a recorded signal thereon of wavelength $\lambda$, for supplying signal fluxes of said predetermined phase to said gaps, the spacing between adjacent poles being substantially equal to one half $\lambda$.

27. The head of claim 26 with said magnetic scale being of rigid material and of substantially greater length than said groups of magnetic plates and having a recorded wavelength $\lambda$ equal to approximately 0.1 millimeter, the magnetic plates defining a number of gaps of the order of 12, and the signal recorded on the magnetic scale being simultaneously coupled to each of said number of gaps to produce respective voltages in each of the coils which are all additive with respect to said series circuit, regardless of the position of said magnetic scale relative to said magnetic plates throughout the extent of said magnetic scale.

28. In combination in a system for sensing relative motion including a magnetic scale comprising rigid material having a periodically recurring signal recorded along a lengthy magnetic record track thereon, the signal having a substantially constant recorded wavelength λ, a magnetic transducer head having output means and having a plurality of poles defining a plurality of gaps simultaneously coupled to said track for flux interlinkage between the signal at the respective gaps and said output means, means providing for relative movement of the head and scale over the extent of said track, and means coupled to said output means of said head and responsive to the output of said head output means to indicate the position of said head relative to said scale, the improvement characterized by said poles defining a succession of at least three gaps having substantially equal extent in the direction of relative movement between the head and track, the successive gaps having a spacing of substantially $m\lambda/2$ where $m$ is an interger, and the output means being coupled to the poles so as to provide outputs in response to the signal at each of the gaps which are simultaneously additive, the output from the output means comprising an output amplitude increased over the output amplitude produced by one of said gaps in accordance with the number of gaps.

29. The combination of claim 28 with the spacing between the successive poles being substantially equal to λ/2, the gaps having a size of the order of λ/4, and the poles being spaced from the scale about 0.1λ.

30. The combination of claim 28 with the transducer head comprising a ring-type core with laterally offset, laterally overlapping poles of alternate polarity, the poles having a spacing of about λ/2 and the poles defining a number of gaps of the order of 12.

31. The combination of claim 30 with the scale having a recorded wavelength λ of about 0.1 millimeter, and the poles being spaced from the scale a distance of the order of 0.1λ.

References Cited by the Examiner

UNITED STATES PATENTS

| | | | |
|---|---|---|---|
| 2,300,320 | 10/1942 | Swartzel | 179—100.2 |
| 2,337,148 | 12/1943 | Barns | 336—212 X |
| 2,536,810 | 1/1951 | Holmes et al. | 179—100.2 |
| 2,784,259 | 3/1957 | Camras | 179—100.2 |
| 2,947,929 | 8/1960 | Bower | 340—174.1 |
| 3,041,486 | 6/1962 | Moffitt | 336—135 X |
| 3,150,358 | 9/1964 | Newman et al. | 340—174.1 |
| 3,239,823 | 3/1966 | Chang | 179—100.2 |

BERNARD KONICK, *Primary Examiner.*

JOHN F. BURNS, T. K. KOZMA, V. P. CANNEY, *Assistant Examiners.*